United States Patent
Sinha et al.

(10) Patent No.: US 10,351,782 B2
(45) Date of Patent: Jul. 16, 2019

(54) PROCESS TO PRODUCE AROMATICS RICH AVIATION FUEL ALONG WITH OTHER C1-C24 HYDROCARBONS

(71) Applicant: COUNCIL OF SCIENTIFIC AND INDUSTRIAL RESEARCH, New Delhi, New Delhi (IN)

(72) Inventors: Anil Kumar Sinha, Uttrakhand (IN); Mohit Anand, Uttrakhand (IN); Saleem Akhtar Farooqui, Uttrakhand (IN); Rakesh Kumar, Uttrakhand (IN); Rakesh Kumar Joshi, Uttrakhand (IN); Rohit Kumar, Uttrakhand (IN); Tasleem Khan, Uttrakhand (IN); Parvez Alam, Uttrakhand (IN)

(73) Assignee: COUNCIL OF SCIENTIFIC AND INDUSTRIAL, New Delhi, Delhi (IN)

( * ) Notice: Subject to any disclaimer, the term of this patent is extended or adjusted under 35 U.S.C. 154(b) by 0 days.

(21) Appl. No.: 15/510,598

(22) PCT Filed: Sep. 11, 2015

(86) PCT No.: PCT/IN2015/050109
§ 371 (c)(1),
(2) Date: Mar. 10, 2017

(87) PCT Pub. No.: WO2016/038633
PCT Pub. Date: Mar. 17, 2016

(65) Prior Publication Data
US 2017/0253808 A1   Sep. 7, 2017

(30) Foreign Application Priority Data
Sep. 12, 2014   (IN) ........................... 2622/DEL/2014

(51) Int. Cl.
*C10G 3/00*   (2006.01)

(52) U.S. Cl.
CPC ................. *C10G 3/50* (2013.01); *C10G 3/44* (2013.01); *C10G 3/46* (2013.01); *C10G 3/48* (2013.01);
(Continued)

(58) Field of Classification Search
CPC ... C10G 3/50; C10G 3/48; C10G 3/46; C10G 2300/1014; C10G 2300/4006; C10G 2400/08; C10G 2400/30
See application file for complete search history.

(56) References Cited

U.S. PATENT DOCUMENTS

| | | | |
|---|---|---|---|
| 2,163,563 A | 6/1939 | Schrauth | |
| 4,300,009 A | 11/1981 | Haag et al. | |

(Continued)

FOREIGN PATENT DOCUMENTS

| | | |
|---|---|---|
| WO | WO 2008/054442 A1 | 5/2008 |
| WO | WO 2009/039000 A2 | 3/2009 |

(Continued)

OTHER PUBLICATIONS

Sivasamy et al. (Catalytic applications in the production of biodiesel from vegetable oils, ChemSusChem, 2009, 2, 278-300) (Year: 2009).*

(Continued)

*Primary Examiner* — Youngsul Jeong
(74) *Attorney, Agent, or Firm* — Lewis Roca Rothgerber Christie LLP

(57) ABSTRACT

A single step catalytic process for the preparation of aromatic rich aviation fuel from renewable resource in the presence of a hydrogen stream, and one or more hydroprocessing catalysts, under operating conditions for hydroconversion reactions, as defined herein, with mixed hot and cold streams of the renewable feed and getting desired product after separation of water, lighter hydrocarbon gases and (Continued)

carbon oxides, the said product comprising of hydrocarbons C6-C24, rich in aromatic content in the aviation fuel range, including kerosene range.

6 Claims, 1 Drawing Sheet

(52) U.S. Cl.
CPC ....... *C10G 3/60* (2013.01); *C10G 2300/1014* (2013.01); *C10G 2300/1018* (2013.01); *C10G 2300/1051* (2013.01); *C10G 2300/1055* (2013.01); *C10G 2300/4006* (2013.01); *C10G 2400/08* (2013.01); *C10G 2400/30* (2013.01); *Y02P 30/20* (2015.11)

(56) References Cited

U.S. PATENT DOCUMENTS

| | | | |
|---|---|---|---|
| 4,992,605 | A | 2/1991 | Craig et al. |
| 5,705,722 | A | 1/1998 | Monnier et al. |
| 7,459,597 | B2 | 12/2008 | Koivusalmi et al. |
| 7,491,858 | B2 | 2/2009 | Murzin et al. |
| 2004/0230085 | A1 | 11/2004 | Jakkula et al. |
| 2010/0076238 | A1 | 3/2010 | Brandvold et al. |
| 2012/0041240 | A1* | 2/2012 | Nunez Isaza ........... C08L 91/06 585/16 |
| 2012/0165581 | A1* | 6/2012 | Dupassieux ............. C10G 3/42 585/240 |

FOREIGN PATENT DOCUMENTS

| | | |
|---|---|---|
| WO | WO 2009/039335 A1 | 3/2009 |
| WO | WO 2009/039347 A1 | 3/2009 |
| WO | WO 2014/049621 A1 | 4/2014 |

OTHER PUBLICATIONS

International Preliminary Report on Patentability dated Nov. 22, 2016 for corresponding International Application No. PCT/IN2015/050109, 13pp.

International Search Report and Written Opinion dated Jan. 25, 2016 for corresponding International Application No. PCT/IN2015/050109, 10pp.

Written Opinion of the International Preliminary Examining Authority dated Sep. 8, 2016 for corresponding International Application No. PCT/IN2015/050109, 7pp.

* cited by examiner

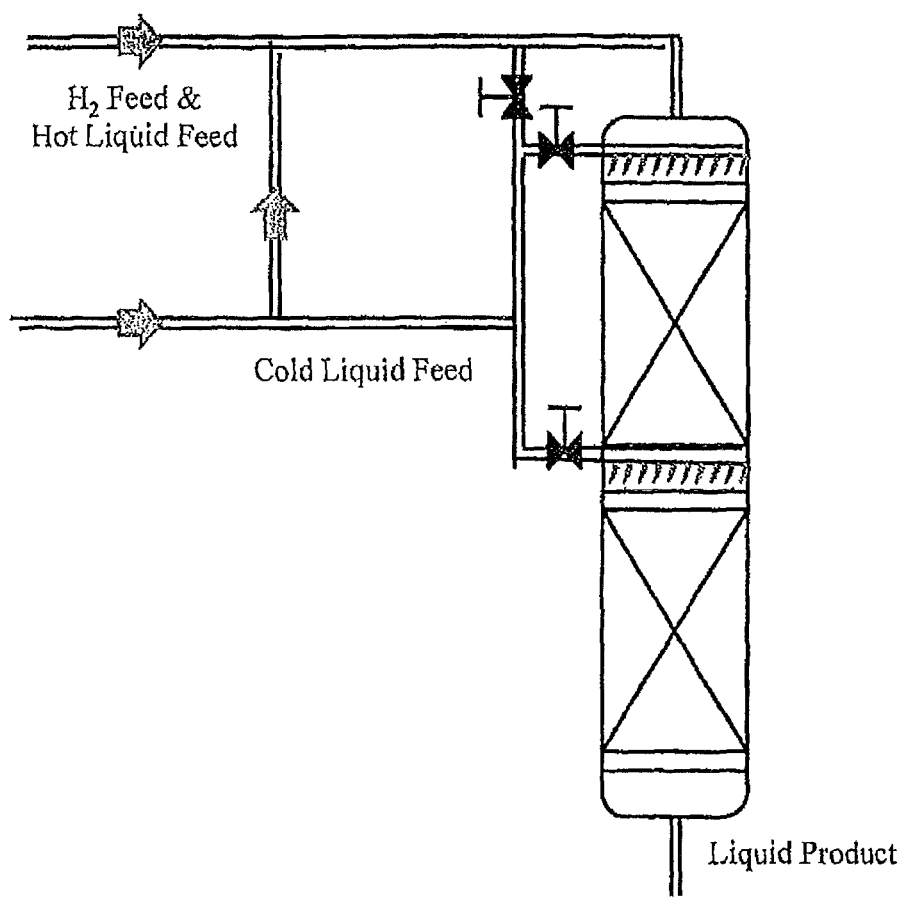

US 10,351,782 B2

PROCESS TO PRODUCE AROMATICS RICH AVIATION FUEL ALONG WITH OTHER C1-C24 HYDROCARBONS

CROSS-REFERENCE TO RELATED APPLICATION(S)

This application is a National Phase Patent Application and claims the priority of International Application Number PCT/IN2015/050109, filed on Sep. 11, 2015, which claims priority to Indian Patent Application No. 2622/DEL/2014, filed Sep. 12, 2014, the entire contents of which are incorporated herein by reference.

An improved process to produce aromatics rich aviation fuel along with other C1-C24 hydrocarbons.

FIELD OF THE INVENTION

This invention falls within the processing field of hydroconversion, more specifically, hydroprocessing of vegetable triglycerides and free fatty acids using a energy efficient catalytic process to produce parafins, iso-parafins, cycloparaffins and aromatics with higher kerosene yield, controlled exothermicity with better heat utilization, no additional quench gas requirement, reactor bed temperature control and better process control.

BACKGROUND OF THE INVENTION

Increased demand for cleaner fuel due to environmental concern and depleting petroleum reserves in the world coupled with deteriorating quality of the crude oil have led a surge of research for renewable and clean fuel sources. One of the renewable sources may be the oil originating from vegetables and animals such as waste restaurant oil, soybean oil, Jatropha oil, and algae oil etc. This also helps in rural development by providing better cost for their products. But these oils originating from vegetables and animals cannot be used directly in the engine due to the problems inherent with these oils such as higher viscosity and oxygen content and poor atomization and lubricity. Therefore before using in the engine these oils are to be converted into bio-diesel or green diesel. Bio-diesel which is Fatty Acid Methyl Esters (FAME) is produced by transesterification of fatty acids in triglycerides. To use bio-diesel in the engine requires some modification and additional disadvantages are poor performance in cold weather and poor emission. Another way of effectively using these renewable oils is by converting these oils into hydrocarbons with much higher cetane value than conventional diesel fuel. This process involves conversion of fatty acids in triglycerides into linear and/or iso-alkanes. This may be obtained by hydrodeoxygenation, decarbonylation, decarboxylation, isomerisation and hydrocracking or a combination of two or more thereof.

The patented literature presents some documents in the hydrogenation of vegetable oil, but these documents do not consider in their scope the intended range covered by this invention.

U.S. Pat. No. 2,163,563 discloses the hydrogenation of vegetable oils combined with mineral oil over a reduced Ni catalyst supported in alumina in the presence of hydrogen at high pressure [5 MPa to 50.6 MPa (56 to 500 atmospheres)]. However, this patent does not involve hydrotreatment of a combined load of petroleum and vegetable oils through an HDT process. U.S. Pat. No. 4,300,009 describes a process for generating the product having the boiling point at the range of gasoline boiling point range. This process involves catalytic conversion of anabolites (substances formed in the anabolic process) as resins, vegetable oils and fats in liquid hydrocarbons over zeolites with an effective pore size bigger than 5 Angstrom. U.S. Pat. No. 5,705,722 describes a process to produce additives for diesel fuel which have higher cetane number and may improve ignition of the fuel. The process involves hydroprocessing of the biomass, containing a high proportion of unsaturated fatty acids, wood oils, animal fats and other mixtures in the presence of hydrogen over catalyst. This mixture is then separated and fractioned to obtain a hydrocarbon product with boiling point at the range of diesel's boiling point, being this product the additive with a high cetane number. However the addition of a petroleum hydrocarbon to the biomass load which is being hydroprocessed is not mentioned within this document.

U.S. Pat. No. 4,992,605 describes a process to obtain a stream with a high cetane number to be added to the diesel in the refinery. The process involves hydroprocessing of vegetable oils such as canola or sunflower oil, palm and wood oil that is a waste product from the wood pulp industry, to produce hydrocarbon products in the diesel boiling range by using sulfided catalyst (NiMo and CoMo) in the presence of hydrogen (pressure of 4 to 15 MPa) and temperature in the range of 350° C. to 450° C. This patent does not consider a mixture of a hydrocarbon with vegetable oil in the hydrorefining. Patents U.S. Pat. Nos. 7,491,858, 7,459,597B2, describe production of diesel fuel from vegetable and animal oils and also the further isomerization of obtained hydrocarbons using catalysts known in the prior art. Patent WO 2008054442 describes a process for converting triglycerides to hydrocarbons. U.S. Pat. No. 4,300,009 describe the production of hydrocarbons such as gasoline and chemicals such as para-xylene from plant oils such as corn oil by using of crystalline aluminosilicate zeolites. US 2004/0230085 A1 discloses a process for treating a hydrocarbon component of biological origin by hydrodeoxygenation followed by isomerization.

WO 2009/039000, WO 2009/039335, WO/2009/039347 describe a process which comprises one or more steps to hydrogenate, decarboxylate, decarbonylate, (and/or hydrodeoxygenate) and isomerize the renewable feedstock, the consumption of hydrogen in the deoxygenation reaction zone is reduced by using at least one sulfur containing component which also operates to maintain the catalyst in a sulfided state.

Patents 0175NF2012; 0176NF2012, describe a single step catalyst and process for hydroconversion of vegetable oils triglycerides and free fatty acids to directly to iso-paraffins, paraffins, cyclic and aromatics in the kerosene range to produce aviation fuel.

The conversion of renewable feed stocks into aviation fuel and other hydrocarbons is energy intensive. These are highly exothermic reactions with very high hydrogen consumption, which is major concern for commercial realization of these processes. These highly exothermic reactions, not only decreases the catalyst life but also leads to unwanted cracking and coke formation reactions in catalyst pores; further leading to high pressure drop, low catalyst life and costly process. The hydrogen requirement is increased as the unsaturated hydrocarbons formed due to unwanted cracking reactions gets saturated and hence require extra hydrogen which further adds up the cost. The process and catalyst discussed in earlier literatures does not describe the utility of cold feed stream and its advantages in processing these renewable feedstocks. Also the process discussed does not describe an efficient heat utilization methodology to be followed for these highly exothermic reactions.

To realize a commercial future of these feedstocks, it is very necessary to develop technologies which would deliver hydrocarbon fuels including aviation fuel at competitive prices to crude based fuels. A single step process where hydrogen requirement for conversion of these renewable feed stocks would be less along with reactions with controlled exothermicity is highly desirable. A process and catalyst where these renewable feedstocks are converted selectively to paraffins, isoparaffins, cyclics and aromatics in C1-C24 range hydrocarbons directly without additional gas requirement for quenching, with reduced hydrogen consumption and controlled exothermicity is required.

OBJECTS OF THE INVENTION

The objective of the present invention is to develop methodology for controlling these exothermic reactions as well as maintaining the desired conversions and yields of desired products with reduced hydrogen consumption. By utilizing the energy generated on the catalyst surface, the activation barrier for other feed molecules is reached which drives the reaction further and stable reaction temperature are maintained without any runaway. This energy utilization also prevents unwanted side reactions from taking place over the catalyst surface which consume additional hydrogen. An innovative methodology combining hot and cold streams of the same feed for controlling these exothermic reactions is used which also results in higher yields of desired aviation kerosene. The cold feed stream is heated in-situ due to exothermic reactions already taking place over the catalytic surface with the hot stream.

SUMMARY OF THE INVENTION

The present invention relates to a low energy catalytic process for the manufacture of the n-paraffins, iso-paraffins, cyclic and aromatics for gasoline and/or aviation turbine fuel and/or diesel range hydrocarbons (C1-C24 range) from renewable source such as oils originating from jatropha and similar feedstocks such as algae, animal fats, karanj oil etc. Accordingly present invention provides a single step catalytic process for the preparation of aromatic rich aviation fuel from renewable resource in the presence of a hydrogen stream, and one or more hydroprocessing catalysts, under operating conditions for hydroconversion reactions, as defined herein, with mixed hot and cold streams of the renewable feed and getting desired product after separation of water, lighter hydrocarbon gases and carbon oxides, the said product comprising of hydrocarbons C6-C24, rich in aromatic content in the aviation fuel range, including kerosene range. In an embodiment, the hydroconversion conditions used in the process performed in the presence of one or more metal sulfides of Group VI and/or Group VIII elements, at a pressure of from 40 to 110 bar; at an average temperature of the catalytic bed of from 250° C. to 500° C., at a space-velocity of from 0.5 $h^{-1}$ to 3 $h^{-1}$, and at a hydrogen load ratio of from 500 NL of hydrogen/L of mixture to 5000 NL hydrogen/L of mixture, to obtain a liquid hydrocarbon product with C6-C24 content of up to 100% and a boiling point in the range of gasoline, kerosene and diesel. In an another embodiment of present invention the mixed cold and hot streams of the renewable feeds are processed such that cold feed passed simultaneously with hot feed in ratio varying between 1-100.

DETAILED DESCRIPTION OF THE INVENTION

The present invention relates to a low energy catalytic process for the manufacture of the n-paraffins, iso-paraffins, cyclic and aromatics for gasoline and/or aviation turbine fuel and/or diesel range hydrocarbons from renewable source such as oils originating from vegetable and animal fats with reduced exothermicities and reduced hydrogen consumptions. The renewable feed stock (hot and cold) is converted into hydrocarbons by similar pathways such as decarboxylation/decarbonylation and hydrodeoxygenation along with cracking, isomerisation, cyclization and aromaticization reactions, producing water, CO, CO2, lighter hydrocarbon gases including propane as side-products. Better product selectivity is obtained by suitably selecting the catalyst and process conditions with controlled exothermicities (using same liquid feed, partially by varying quench feed 1-100% of the total) and with favorable changes in the product pattern thereby lowering hydrogen consumption. The renewable source (hot and cold) is contacted with a catalyst in the presence of hydrogen at temperature and pressure and liquid hourly velocity of 320-500° C., 30-150 atm and 0.5-6.0 $h^{-1}$ respectively. For preventing temperature runaway conditions the extent of exothermicity is controlled by passing cold feed simultaneously with hot feed in ratio varying between (1-100). The temperature of the cold feed increases insitu due to exothermic reactions already taking place over the catalytic surface. The energy generated on the catalyst surface is utilized for reaching the activation barrier for other cold feed molecules, which drives the reaction further without the need of any additional energy source. The product patterns thus obtained are very much similar to those obtained over the single step catalytic process and similar conversion levels could be achieved. There is also increase in yield of jet range hydrocarbons along with cyclic and aromatics because of reduction in additional side reactions earlier taking place at increased temperatures. In addition to reduction in hydrogen consumption because of reduced side reactions, the high pressure off gases coming from the High pressure separator axe recycled back for reducing the make up of fresh hydrogen gas required in the process. Recycle gas in turns builds up the partial pressure of CO2, CO and lighter hydrocarbons inside the reactor but there is enough partial pressure of $H_2$ available for minimizing the formation of waxy oligomerized product and hence avoid catalyst deactivation. Further, since most of the vegetable oil components are bulky molecules, the catalyst supports developed such as alumina and silica-alumina or a combination of two or more thereof have 3-dimensional mesoporosity for efficient diffusion of reactants and selective diffusion of products with minimum pore blockage by coking. This prevents any additional side reactions for further transformations of primary reactions products such as' further reduction of aromatic and cyclic hydrocarbon compounds formed into saturates and open ring compounds. Minimizing the secondary unwanted reactions reduces the total hydrogen consumption of the process. This dramatically improves the life of the catalyst, and also makes the regenerability of the catalyst more convenient. Preferably, high surface area mesoporous silica-alumina is used as support due to high dispersion of nanoparticles of active metals in the mesopores and on the surface. Non-precious metals are used as active metals in the catalyst. Non precious metals including nickel (Ni), cobalt (Co), molybdenum (Mo), tungsten (W), or combination thereof, e.g., nickel-molybdenum (NiMo), cobalt-molybdenum (CoMo) nickel-tungsten (Ni—W) are used as active metals. These active metals are supported in mesoporous γ-alumina (γ-Al2O3), silica-alumina, or a combination thereof. The active metal(s) may be either in the reduced or sulfided form. Catalyst is sulfided/reduced in the reactor itself using the conventional methodology followed for hydrocracking catalysts (Patents 0175NF2012; 0176NF2012).

In one embodiment of this invention, renewable vegetable oils such as pure triglycerides preferably jatropha oil containing free fatty acids, or algal oil, waste cooking oil in the range of 1% to 100% by volume, preferably between 1% and 60% by volume, is contacted with disclosed catalyst in the presence of hydrogen at elevated temperature and pressure. One part of the oil is preheated to catalyst bed temperature and the other cold part is sent directly over the catalyst surface without any pre-heating (the FIGURE). The cold feed could be used in any ratio from 1 to 100% over the catalyst surface in the presence of hydrogen. In addition to cold feed, the high pressure off gases coming from the High pressure separator was recycled back for reducing the make up of fresh hydrogen gas required in the process. Recycle gas in turn builds up the partial pressure of CO2, CO and lighter hydrocarbons inside the reactor but there is enough partial pressure of H2 available for minimizing the formation of waxy oligomerized product and hence avoid catalyst deactivation. The ratio of recycle gas to make-up was varied from 1:100 keeping the partial pressure of hydrogen inside the reactor not below 40 bar. The temperature range of the catalytic bed may vary from 250° C. to 500° C., preferably between 300° C. to 480° C. The pressure range of the catalytic bed may vary from 30 to 150 bar, preferably in the range of 40 to 120 bar. The space velocity range may be from 0.5 h-1 to 6 h-1, preferably between 1 h-1 and 4 h-1. The hydrogen/hydrocarbon ration in the reactor may vary from 500 NL of hydrogen/L of hydrocarbon to 4000 NL of hydrogen/L of hydrocarbon preferably between 1200 NL of hydrogen/L of hydrocarbon to 3000 NL of hydrogen/L of hydrocarbon. The products were analyzed by gas-chromatography ASTM D6730 DHAX analysis. The concentration of sulfur was determined by XRF analysis. Simulated distillation of the products were carried out according to the ASTM-2887-D86 procedure. Total acidity number (TAN) was determined following ASTMD974 method. With the indication of catalyst deactivation in terms of appearance of unreacted triglyceride as observed by GC, the catalyst is resulfided by putting 1000 ppm dimethyldisulfide in the vegetable oil.

BRIEF DESCRIPTION OF THE DRAWINGS

The FIGURE: Flow Methodology for Hot and cold feed use.

EXAMPLES

Below, the present invention is further described in detail by working Examples, to which the present invention is not limited. The products were analyzed by gas-chromatography, ASTM D6730 DHAX analysis. Simulated distillation of the products was carried out according to the ASTM-2887-D86 procedure. Total acidity number (TAN) was determined following ASTMD974 method.

Example 1

Jatropha oil was processed in a fixed bed reactor with sulfided Ni—Mo/SiO$_2$—Al$_2$O$_3$. The reaction conditions for experiments were: 455° C., 100 bar, 0.95 h$^{-1}$, and 3500 liter H$_2$ gas/liter liquid feed. The ratio of hot and cold feed streams was 70:30 (hot liquid: 0.722 Lit/hr and Cold Liquid: 0.310 lit/hr) and the hydrogen partial pressure was maintained at 86 bar, recycle gas composition given below. The products were analyzed by gas-chromatography. Simulated distillation of the products carried out according to the ASTM-2887-D86 procedure showed that the products had 9.8% of product in diesel range (>C15) and 54.0% in kerosene range (C9-15) and complete conversion. ASTM D6730 DHAX analysis showed 8.5% aromatics in the kerosene range with isomer to normal hydrocarbon ratio (i/n) 2. Total acidity number (TAN) determined following ASTMD974 method was 0.15 mg KOH/g for the product.

Example 2

Jatropha oil was processed in a fixed bed reactor with sulfided Ni—Mo/SiO$_2$—Al$_2$O$_3$. The reaction conditions for hydrotreating experiments were: 455° C., 100 bar, 1.01 h$^{-1}$, and 3500 liter H$_2$ gas/liter liquid feed. The ratio of hot and cold feed streams was 5:95 (hot liquid: 0.055 Lit/hr and Cold Liquid: 1.043 lit/hr) and the hydrogen partial pressure was maintained at 87 bar, recycle gas composition given below. The products were analyzed by gas-chromatography. Simulated distillation of the products carried out according to the ASTM-2887-D86 procedure showed 6.5% of product in diesel range (>C15) and 40.4% in kerosene range (C9-C15) with isomer to normal hydrocarbon ratio (i/n) 1.7 and complete conversion. ASTM D6730 DHAX analysis showed around 7.5% aromatics in the kerosene range. Total acidity number (TAN) determined following ASTMD974 method was 0.16 mg KOH/g for the product.

TABLE 1

| Recycle gas composition | | | | | | | | |
|---|---|---|---|---|---|---|---|---|
| | Recycle % | H2 mole % | CO2 mole % | CO mole % | C1 mole % | C2 mole % | C3 mole % | C4 mole % | C5 mole % |
| Exp 1 | 0.81 | 86.19 | 3.46 | 3.88 | 3.00 | 1.68 | 1.36 | 0.27 | 0.05 |
| Exp 2 | 0.81 | 87.39 | 2.88 | 3.94 | 2.19 | 1.50 | 1.65 | 0.35 | 0.10 |

TABLE 2

Product details and energy savings

| Experiment | Temp. (° C.) | P (bar) | WHSV (h$^{-1}$) | H$_2$/HC | <C9, wt % | C9-C15, wt % | >C15, wt % | aromatics | i/n (C9-C15) | Energy saved |
|---|---|---|---|---|---|---|---|---|---|---|
| Comp. Ex. 1 | 455 | 100 | 1.01 | 3500 | 18.9 | 38.1 | 42.4 | 12% | 1.77 | 0 kJ/kg |
| Ex. 1 | 455 | 100 | 0.95 | 3500 | 36.1 | 54.0 | 9.8 | 8.5% | 2.00 | 700 kJ/kg |
| Ex. 2 | 455 | 100 | 1.01 | 3500 | 53.1 | 40.4 | 6.5 | 7.5% | 1.69 | 700 kJ/kg |

Comparative Example 1

Jatropha oil was processed in a fixed bed reactor with sulfided Ni—Mo/SiO$_2$—Al$_2$O$_3$. The reaction conditions for hydrotreating experiments were: 4550 C, 100 bar, 1.01 h-1, and 3500 ml H2 gas/ml liquid feed. The products were analyzed by gas-chromatography. The liquid feed was sent to the reactor through the pre-heater heated at 3700 C Simulated distillation of the products carried out according to the ASTM-2887-D86 procedure showed 38.1% middle range product (C9-C15) with isomer/normal hydrocarbon ratio 1.8 and complete conversion. ASTM D6730 DHAX analysis showed around 12% aromatics in the kerosene range.

Chemical Reactions:

The raise in temperature of the cold feed in the presence of catalytic materials leads to C—C coupling reactions along with other deoxygenation reactions such as hydro deoxygenation, decarboxylation and decarbonylation reactions. The unsaturates generated in the reaction media tend to undergo cyclization followed by aromatization. The lower hydrogen partial pressure 86 (Exp 1) & 87 (Exp 2) as compared to that in case of pure hydrogen make-up 100 bar also increases the tendency of these unstable molecule due to thermal cracking to undergo these changes. The exothermicity released due to deoxygenation heat of the reaction is utilized by the cold feed and is also used for further hydrocracking and isomerisation reactions with similar isomer to normal ratios and comparable C9-C15 yields.

Advantages

The present invention relates to a low energy catalytic process for the manufacture of the n-paraffins, iso-paraffins, cyclic and aromatics for aviation turbine fuel along with diesel and gasoline range hydrocarbons from renewable source such as oils originating from vegetable and animal fats with reduced exothermicities. The renewable feedstock (hot and cold streams) is converted into hydrocarbons by similar pathways such as decarboxylation/decarbonylation and hydrodeoxygenation along with cracking, isomerisation, cyclization and aromatization reactions. Better kerosene product and isomer selectivity is obtained by process conditions with controlled exothermicities (using same liquid feed, but adding cold feed along with pre-heated hot feed) and leading to desirable product pattern.

In the present invention, the use of cold feed not only controls the exothermicity of the reaction but the overall economy is improved. The energy utilized in heating the liquid feed is decreased by 700 kJ/Kg when cold feed is directly fed to the reactor along with preheated liquid feed. Moreover, the excess hydrogen which is generally required as quench to control the reactor bed temperature will not be required in this case. Additional quench gas would require large volume of all the equipments in the downstream of the reactor, and hence would require higher capital cost compared to that without gas quench stream.

In the present invention, the use of cold feed, decreased the heavier component in the product stream drastically, which is highly beneficial for the production of lighter and middle distillate component. The ratio of isomer/normal hydrocarbon is also observed to be increased.

We claim:

1. A single step catalytic process for preparation of aromatic rich aviation fuel from a renewable resource feed in the presence of a hydrogen stream, and one or more hydroprocessing catalysts, under operating conditions for hydroconversion reactions, the single step catalytic process comprising sending the renewable resource feed to a catalyst bed, wherein the renewable resource feed comprises a hot stream of the renewable resource feed comprising vegetable oils preheated to a temperature of the catalyst bed in a range of 250-500° C. and a cold stream having a temperature lower than that of the hot stream and comprising another part of the same renewable resource feed sent directly to the catalyst bed without pre-heating, wherein the renewable resource feed does not include compounds converted by the catalyst bed from vegetable oils, and obtaining a product from an effluent of the catalyst bed after separation of water, lighter hydrocarbon gases and carbon oxides from the effluent, the product comprises hydrocarbons C6-C24 rich in aromatic content such that an aromatic content of the product is in aviation fuel range, and wherein the aromatic content of the product is greater than or equal to 7.5 wt %.

2. The process according to claim 1, wherein the cold stream, in a ratio in a range of 1 to less than 100 vol % of the renewable resource feed, is processed with the hot stream part of the renewable resource feed and both the hot and cold streams undergo hydroconversion reactions.

3. The process according to claim 1, wherein the renewable resource feed comprises vegetable oils comprising jatropha oil, karanj oil, and/or algae oil.

4. The process according to claim 1, wherein the catalytic process is performed in the presence of one or more metal sulfides of Group VI and/or Group VIII elements, at a pressure of from 40 to 110 bar, at an average temperature of the catalytic bed of from 340° C. to 500° C., at a space-velocity of from 0.5 h$^{-1}$ to 3 h$^{-1}$, and at a hydrogen load ratio of from 550 NL of hydrogen/L of mixture to 5000 NL hydrogen/L of mixture, to obtain a liquid hydrocarbon product with C6-C24 content of up to 100 wt % and a boiling point in ranges of gasoline, kerosene and diesel fuels.

5. The process according to claim 1, wherein kerosene range hydrocarbons in the product can be maximized by direct injecting the cold stream to the reactor while controlling exothermicity, utilizing heat and maintaining the catalyst bed temperature within 340° C. to 500° C.

6. The process according to claim 1, wherein the aromatic content of the product is in a range of 7.5 wt % to 12 wt%.

* * * * *